United States Patent
Tsirkin et al.

(10) Patent No.: US 11,734,182 B2
(45) Date of Patent: *Aug. 22, 2023

(54) LATENCY REDUCTION FOR KERNEL SAME PAGE MERGING

(71) Applicant: Red Hat, Inc., Raleigh, NC (US)

(72) Inventors: Michael Tsirkin, Westford, MA (US); Karen Lee Noel, Pembroke, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,678

(22) Filed: Jun. 13, 2022

(65) Prior Publication Data
US 2022/0318149 A1    Oct. 6, 2022

Related U.S. Application Data

(63) Continuation of application No. 17/035,057, filed on Sep. 28, 2020, now Pat. No. 11,360,904.

(51) Int. Cl.
| | |
|---|---|
| *G06F 12/00* | (2006.01) |
| *G06F 12/0882* | (2016.01) |
| *G06F 12/0873* | (2016.01) |
| *G06F 9/455* | (2018.01) |
| *G06F 12/02* | (2006.01) |

(52) U.S. Cl.
CPC ...... *G06F 12/0882* (2013.01); *G06F 9/45558* (2013.01); *G06F 12/0238* (2013.01); *G06F 12/0873* (2013.01); *G06F 2009/45583* (2013.01)

(58) Field of Classification Search
CPC ............. G06F 12/9882; G06F 9/45558; G06F 12/0238; G06F 12/0873; G06F 2009/45583
See application file for complete search history.

(56) References Cited

U.S. PATENT DOCUMENTS

| | | |
|---|---|---|
| 8,909,845 B1 | 12/2014 | Sobel et al. |
| 9,053,053 B2 | 6/2015 | Bacher et al. |
| 9,904,473 B2 | 2/2018 | Kumar et al. |
| 10,261,820 B2 | 4/2019 | Tsirkin et al. |

(Continued)

OTHER PUBLICATIONS

Shashank Rachamalla, Debadatta Mishra and Purushottam Kulkarni, "All Page Sharing is Equal, but Some Sharing is More Equal than Others", Department of Computer Science and Engineering Indian Institute of Technology Bombay, Accessed on or before Apr. 29, 2020, pp. 1-12.

(Continued)

*Primary Examiner* — Gurtej Bansal
(74) *Attorney, Agent, or Firm* — K&L Gates LLP

(57) ABSTRACT

A system includes a memory including a plurality of memory pages, a processor in communication with the memory, and a supervisor. The supervisor is configured to locate at least two duplicate memory pages of the plurality of memory pages, write-protect the at least two duplicate memory pages, and add the at least two duplicate memory pages to a list. Responsive to a first page of the at least two duplicate memory pages changing, the supervisor is configured to remove the first page from the list. Responsive to a memory pressure-triggering event, the supervisor is configured to remove a second page of the at least two duplicate memory pages from the list. The second page is reused after removal from the list.

20 Claims, 7 Drawing Sheets

(56) References Cited

U.S. PATENT DOCUMENTS

| | | |
|---|---|---|
| 10,318,161 B2 | 6/2019 | Lublin et al. |
| 10,482,064 B2 | 11/2019 | Dmitriev et al. |
| 2018/0059956 A1* | 3/2018 | Tsirkin ................ H03M 7/3091 |

OTHER PUBLICATIONS

Licheng Chen, Zhipeng Wei, Zehan Cui, Mingyu Chen, Haiyang Pan, Yungang Bao "CMD: classification-based memory deduplication through page access characteristics", State Key Laboratory of Computer Architecture, Institute of Computing Technology, Chinese Academy of Sciences; University of Chinese Academy of Sciences; Mar. 1-2, 2014, 5 Pages.

Furquan Shaikh, Fangzhou Yao, Indranil Gupta, Roy H. Campbell, "VMDedup: Memory De-duplication in Hypervisor" 2014 IEEE International Conference on Cloud Engineering, Computer Science Department University of Illinois at Urbana-Champaign, 978-1-4799-3766-0/14 © 2014 IEEE, DOI 10.1109/IC2E.2014.69, pp. 379-384.

* cited by examiner

LATENCY REDUCTION FOR KERNEL SAME PAGE MERGING

CROSS REFERENCES TO RELATED APPLICATIONS

This application is a continuation U.S. patent application Ser. No. 17/035,057, filed on Sep. 28, 2020, the entire contents of which are hereby incorporated by reference.

BACKGROUND

Kernel same page merging is a kernel feature that makes it possible for a hypervisor system to share memory pages that have identical content between multiple processes and/or virtualized guests. Kernel same page merging ("KSM") performs memory deduplication by scanning through main memory for physical pages that have identical content, and identifies the virtual pages that are mapped to those physical phages. KSM leaves one page unchanged, and re-maps each duplicate page to point to the same physical page, after which it releases the extra physical page(s) for re-use.

SUMMARY

The present disclosure provides new and innovative systems and methods for reducing latency for kernel same page merging. In an example, a system includes a memory including a plurality of memory pages, a processor in communication with the memory, and a supervisor. The supervisor is configured to locate at least two duplicate memory pages of the plurality of memory pages, write-protect the at least two duplicate memory pages, and add the at least two duplicate memory pages to a list. Responsive to a first page of the at least two duplicate memory pages changing, the supervisor is configured to remove the first page from the list. Responsive to a memory pressure-triggering event, the supervisor is configured to remove a second page of the at least two duplicate memory pages from the list. The second page is reused after removal from the list.

In an example, a method includes locating, by a supervisor, at least two duplicate memory pages. Additionally, the supervisor write-protects the at least two duplicate memory pages and adds the at least two duplicate memory pages to a list. Responsive to a first page of the at least two duplicate memory pages changing, the supervisor removes the first page from the list. Responsive to a memory pressure-triggering event, the supervisor removes a second page of the at least two duplicate memory pages from the list. Additionally, the method includes reusing the second page after removal from the list.

In an example, a non-transitory machine readable medium stores code, which when executed by at least one processor is configured to locate at least two duplicate memory pages, write-protect the at least two duplicate memory pages, and add the at least two duplicate memory pages to a list. The non-transitory machine readable medium is also configured to remove the first page from the list responsive to a first page of the at least two duplicate memory pages changing and remove a second page of the at least two duplicate memory pages from the list responsive to a memory pressure-triggering event. Additionally, the non-transitory machine readable medium is configured to reuse the second page after removal from the list.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
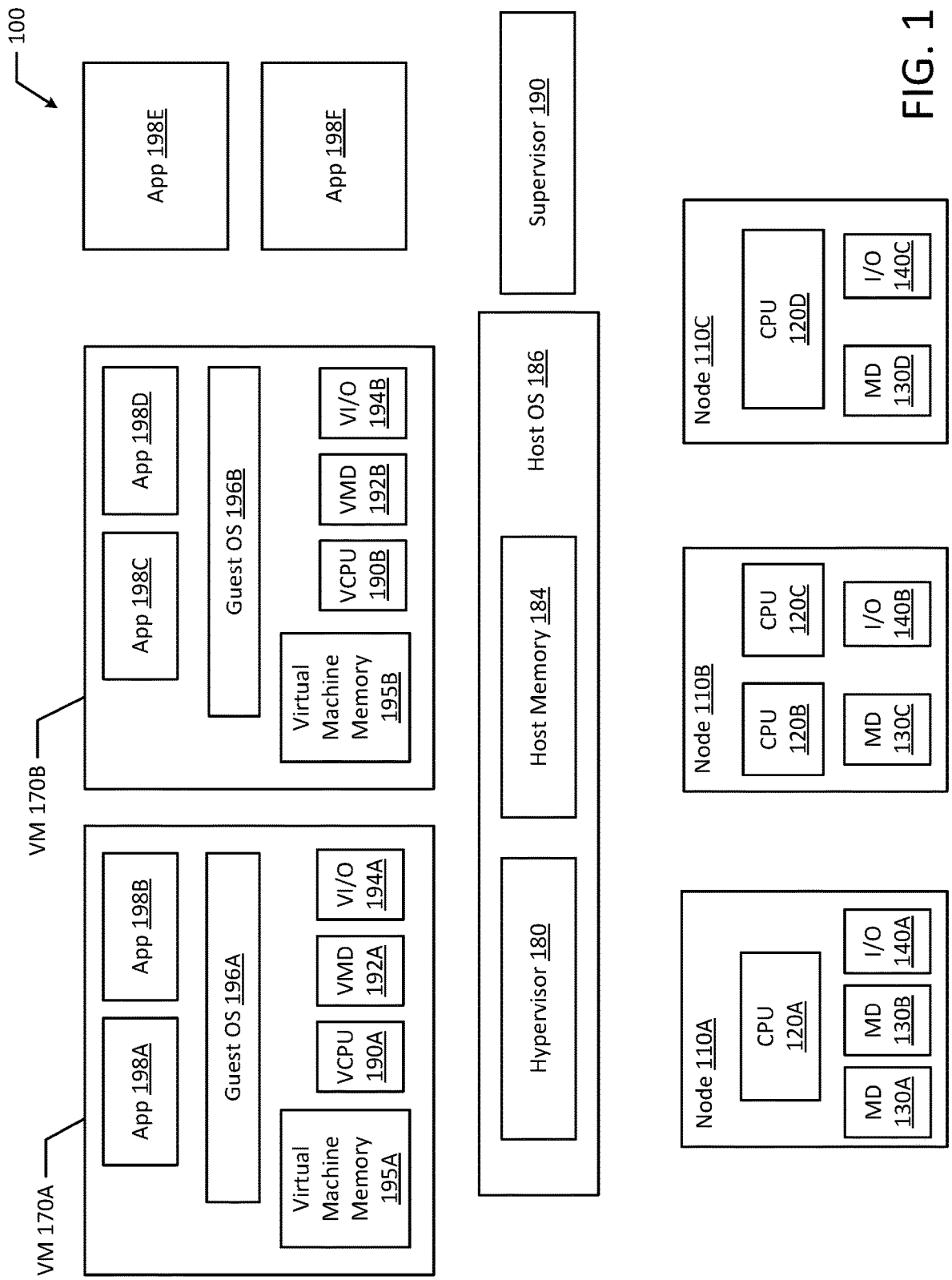
FIG. 1 illustrates a block diagram of an example computer system according to an example embodiment of the present disclosure.

Techniques are disclosed for reducing latency while performing kernel same page merging. For example, duplicate pages may be merged or discarded and made available for re-use to other processes, programs or applications. Kernel same page merging ("KSM") is a technology where a supervisor (for a regular OS) or a hypervisor (for a virtual machine implementation) scans memory of applications or virtual machines and locates identical pages. When identical pages are located, one of the pages is mapped into both applications (or virtual machines) as read-only, and the other duplicate page is discarded. Once the page is discarded, it may be reused for some other process, program or application.

However, KSM is often disabled because it adds latency to processes, programs, applications and virtual machines ("VMs") on the system. In particular, after KSM identifies identical pages, maps one page to multiple applications as read-only, and discards the other identical pages, whenever a guest writes into the page that is mapped across multiple applications as read-only, a fault occurs. To allow the guest to write into the page, the page has to be copied before the write occurs, also called copied-on-write ("COW"). COW, which may sometimes be referred to as implicit sharing or shadowing, is a resource management technique to efficiently implement a "duplicate" or "copy" operation on modifiable resources, such as memory pages. If a resource (e.g., memory page) is duplicated but not modified, the resource can be shared between guests (e.g., applications, guest operating systems, VMs) that use the resource. However, any modifications to the resource result in creating a copy. Typically, the copy operation is deferred until the first write.

By sharing resources in this way, it is possible to significantly reduce the resource consumption of unmodified copies or pages. However, this technique adds overhead to resource-modifying operations. For example, copying the page, and thereby allowing the guest to write to the page adds latency. Specifically, there is significant access latency associated with writing to a shared page that results in a COW fault compared to writing to a non-shared page. For example, creating the copy before writing to the copied page adds I/O latency, which may be up to 100 times more latency than a normal write operation.

In an effort to reduce the latency added by KSM, other technologies such as swap or memory swapping may be used to react to memory pressure and push memory pages to a slower cheaper storage. Memory swapping works by making use of virtual memory and storage space in an approach that provides additional resources when required. For example, memory swapping or Swap is a process that moves memory pages to disk or other type of cheaper storage. For example, disk or other storage may be used to extend the size of RAM, e.g., when a system runs out of RAM, some data in RAM may be swapped out to disk. However, when that data is reference again, the data is swapped back into RAM before it can be accessed by a process, program or application.

Typically, the swap space is the area on an HDD or SSD which forms a part of the virtual memory of the system. The virtual memory may be a combination of the physical memory (e.g., RAM) and the swap space (e.g., SWAP). The swap space may temporarily hold inactive memory. If the system happens to need more memory or space, inactive memory pages in the physical memory are then moved to the swap space, freeing up that physical memory for other uses. Since physical memory or RAM is much faster than SWAP, which is found in a HDD or SDD, typically as a partition, the access time is slower. Therefore, using SWAP will increase CPU usage and the Disk I/O. The increased disk I/O may also increase CPU load. For example, the less RAM the system has, the more SWAP space will be needed for processes, programs and applications on the system. The more SWAP space is used, the more CPU time will be needed to store/retrieve Swap information. For example, swap from RAM to disk will result in the following overheads and latencies (i) increased CPU use for determining what can go into swap, (ii) increased disk I/O and CPU use while moving from physical to swap, (iii) increased CPU use for mapping running applications address space to its swap location, (iv) increased disk I/O from application accessing their swapped memory space, etc.

Furthermore, in virtual environments, the demand on server and storage resources can rise sharply due to frequently recurring events that have high I/O demand, such as boot, login, logoff, shutdown, application patches, etc., which are commonly referred to as I/O storms. Additionally, random workloads can spike throughout the day with no way of knowing where they will occur, or what set of resources they will require. Furthermore, periods with I/O intensive tasks such as boot storms, patching, and antivirus place even more demand on the underlying infrastructure. In addition to the overhead and latency associated with swap mentioned above, swap may also cause the I/O storms discussed above to fetch data from storage on access, which may result in poor performance.

To reduce the latency associated with KSM, duplicate pages may be located and write-protected as usual, which prevents guests (e.g., applications or VMs) from modifying a duplicate memory page that may eventually be shared between multiple guests. However, as long as the memory pressure is below a threshold level (or no memory pressure is detected), the other duplicate pages are retained (e.g., not discarded). Instead, the duplicated pages are added to a list of duplicate pages and each application or VM keeps its own page. When a guest writes to its page, the page is removed from the list of duplicate pages. For example, the write-protection may be modified or removed thereby allowing the guest to write to the page. Thus, the guest can write to the page without having to copy the page as traditionally required by KSM, which advantageously reduces the latency associated with KSM.

Later, if memory pressure triggers, duplicate pages in the list may be removed and reused for other purposes, such as supplied to another application. Once a duplicate page is removed, a write will trigger a COW, but the added overhead and latency associated with the COW is avoided until sufficient memory pressure exists within the system. By waiting to remove duplicate pages until memory pressure exists, the systems and methods described herein reduce latency and perform better than an I/O read for swap. Therefore, KSM data is prepared during normal runtime and is then re-used to handle memory pressure scenarios, which provides improved support for VM and container overcommit.

FIG. 1 depicts a high-level component diagram of an example computing system 100 in accordance with one or more aspects of the present disclosure. The computing system 100 may include an operating system (e.g., host OS 186), one or more trusted execution environments ("TEEs") (e.g., virtual machines 170A-B), and nodes (e.g., nodes 110A-C). The system 100 may include a hypervisor 180, a supervisor 190 (e.g., kernel), or a combination of both.

Virtual machines 170A-B may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

In an example, the computing system 100 may include a hypervisor 180 and host memory 184. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

A virtual machine 170A may execute a guest operating system 196A and run applications 198A-B which may utilize the underlying VCPU 190A, VMD 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186A. In an example, a device may be implemented as a virtual machine (e.g., virtual machine 170A-B).

In another example, system 100 may include a supervisor 190 that coordinates and controls the operation of applications 198E and 198F. In an example, the supervisor 190 may be a kernel or may be part of a kernel. The supervisor 190 or the hypervisor 180 may be configured to locate duplicate memory pages and write-protect the duplicate memory pages. Write-protecting the pages may be implemented efficiently using a page table by marking certain pages of memory as read-only. Additionally, the hypervisor 180 or the supervisor 190 may keep a count of the number of references to the page. Additionally, the supervisor 190 or the hypervisor 180 may be configured to add the duplicate memory pages to a list. The duplicate pages remain on the list until the content of one of the pages changes or until some of the duplicate pages are removed after detecting a memory pressure event.

For example, if an application 198 needs to write to a page when memory pressure has not yet been detected, the hypervisor 180 or supervisor 190 may remove the write-protection and mark the page as read-write in the page table. In another example, the hypervisor 180 or supervisor 190 may be configured to intercept the write attempt, change the page protection, and then proceed with the write attempt.

If memory pressure has already been detected and duplicate pages have been removed, the hypervisor 180 or supervisor 190 may be configured to intercept the write attempt, copy the memory page and allocate the copied memory page, which may be initialized with the copy-on-write data. The new allocation ensures that a change in the memory of one process or application is not visible in another process or applications memory. When the memory page is copied, the hypervisor 180 or supervisor 190 may be configured to update the page table with the new, copied (writable) page and performs the write. By identifying the duplicate pages, but deferring their actual de-duplication, the hypervisor 180 or supervisor 190 may quickly react to memory pressure while avoiding COW overhead unless there is actual memory pressure, which advantageously improves system performance. The improvements in reduced latency and overhead also provide improved support for TEE (e.g., VM and container) overcommit.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
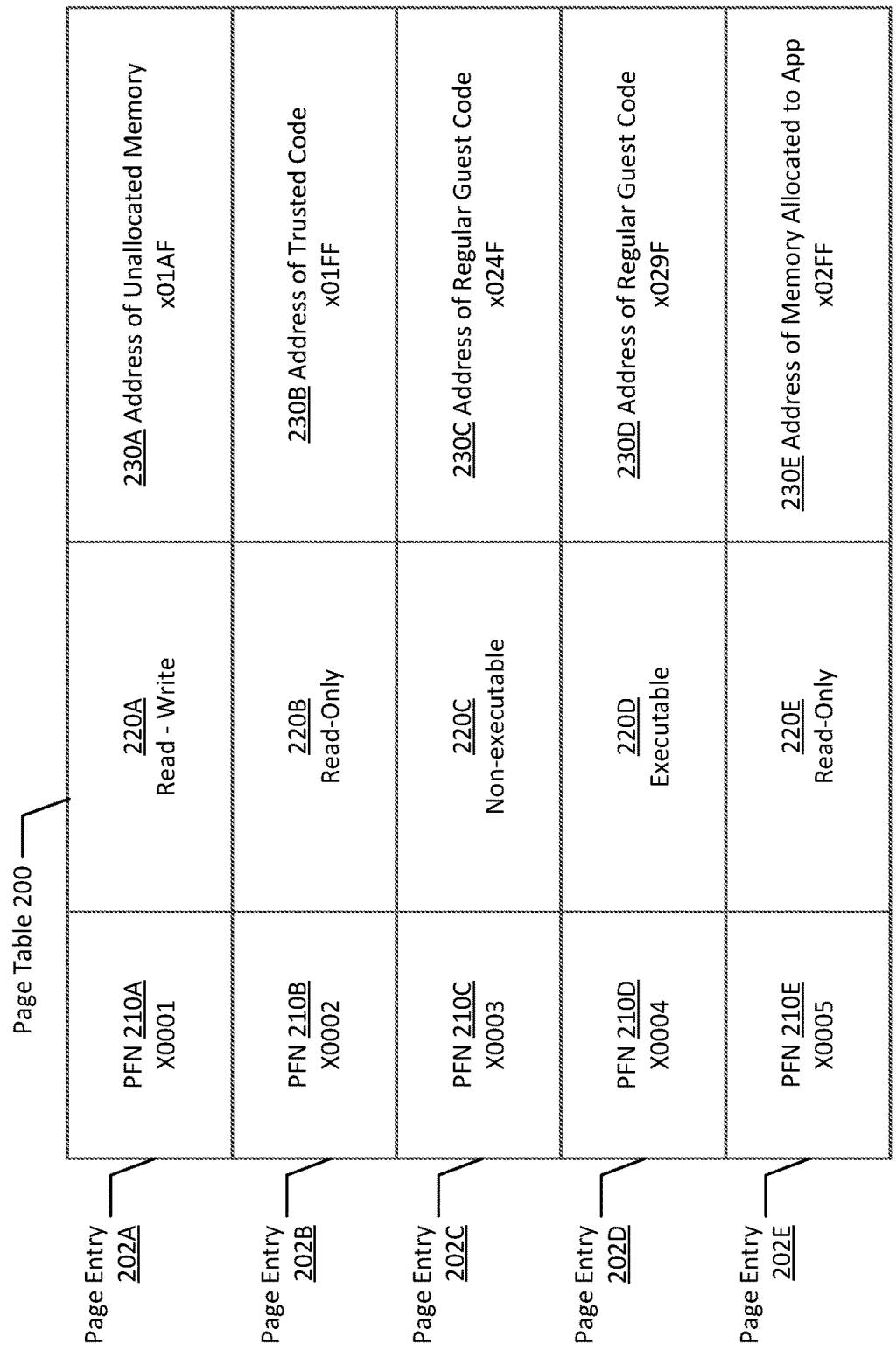
FIG. 2 illustrates a block diagram of an example page table according to an example embodiment of the present disclosure.

FIG. 2 illustrates a block diagram of a page table 200 according to an example of the present disclosure. The page table 200 may be a host page table. In general, the OS 186 may manage the memory usage of the applications 198A-D. The physical memory associated with the applications 198A-D may be divided into pages, which are identified with a unique number (e.g., Page Frame Number (PFN) 210A-E).

Page table 200 is a data structure that may be used to store a mapping of memory addresses of the host memory to memory addresses of the memory available to the TEEs, such as virtual machines or other applications (e.g., applications 198E and 198F). Accordingly, address translation may be handled using the page table(s) 200. In an example, the page table(s) 200 stores a mapping of virtual address to physical addresses.

The page table(s) 200 comprises page entries 202A-E that map PFN 210A-E (e.g., an address of TEE memory, such as virtual memory in the application space) with an address 230A-E. Page table(s) 200 may be used together with any paging data structure to support translation between addresses (e.g., 32-bit linear address space using a two-level hierarchical paging structure, Physical Address Extension mode, INTEL Extended Memory 64 Technology mode, etc.).

In an example, page table(s) 200 may include protection identifiers 220A-E. The protection identifier 220A-E may indicate the access status of a page corresponding to the page entry 202A-E of the page table(s) 200. For example, a protection identifier 220A-E may be used to define that a given page is writable (or read-write), write-protected (or read-only), executable (or executable and readable), executable only, etc. As illustrated in the example in FIG. 2, the page corresponding to page entry 202B, PFN 210B address (x0002), address 230B (x01FF), and protection identifier 220B has been defined in page table 200 as read-only. For example, a hypervisor 186 or supervisor 190 may write-protect a page entry if duplicate memory pages are identified. Page entries 202B and 202E may be identified as duplicate memory pages and each may be write-protected and added to a duplicate memory page list.

As illustrated above, the protection identifier associated with duplicate memory pages is changed to read-only or some other write-protected protection identifier while the other memory entries (e.g., non-duplicate memory pages) can be read-write, executable, etc. For example, the hypervisor 180 may initially write-protect duplicate memory pages as illustrated in FIG. 2. However, if one of the applications needs to write to a duplicate memory page, the hypervisor 180 may intercept a write request and make the associated memory page writable (e.g., read-write).

By doing so, the duplicate pages are read-only, which prevents the contents of the pages from changing while the memory pages are on a duplicate list. For example, the memory pages on the duplicate list are write-protected to prevent their modification in the event the pages are de-duplicated and the remaining page is shared across multiple guests. However, if a write to one of the memory pages occurs, the hypervisor 180 changes the protection identifier, allows the write to occur, and removes the page from the duplicate list. By identifying the duplicate pages, but deferring their actual de-duplication, allows the hypervisor 180 or supervisor 190 (e.g., kernel) to quickly react to memory pressure while avoiding the overhead and latency associated with COW until actual memory pressure exists.

In addition, the page table(s) 200 may include additional information not shown in FIG. 2 including statistics information, background information, dirty identifiers which indicate that modifications to a page must be written back to disk, etc. The sizes of different page table(s) 200 may vary and may include more or fewer entries than are illustrated in FIG. 2.

Figure 3:
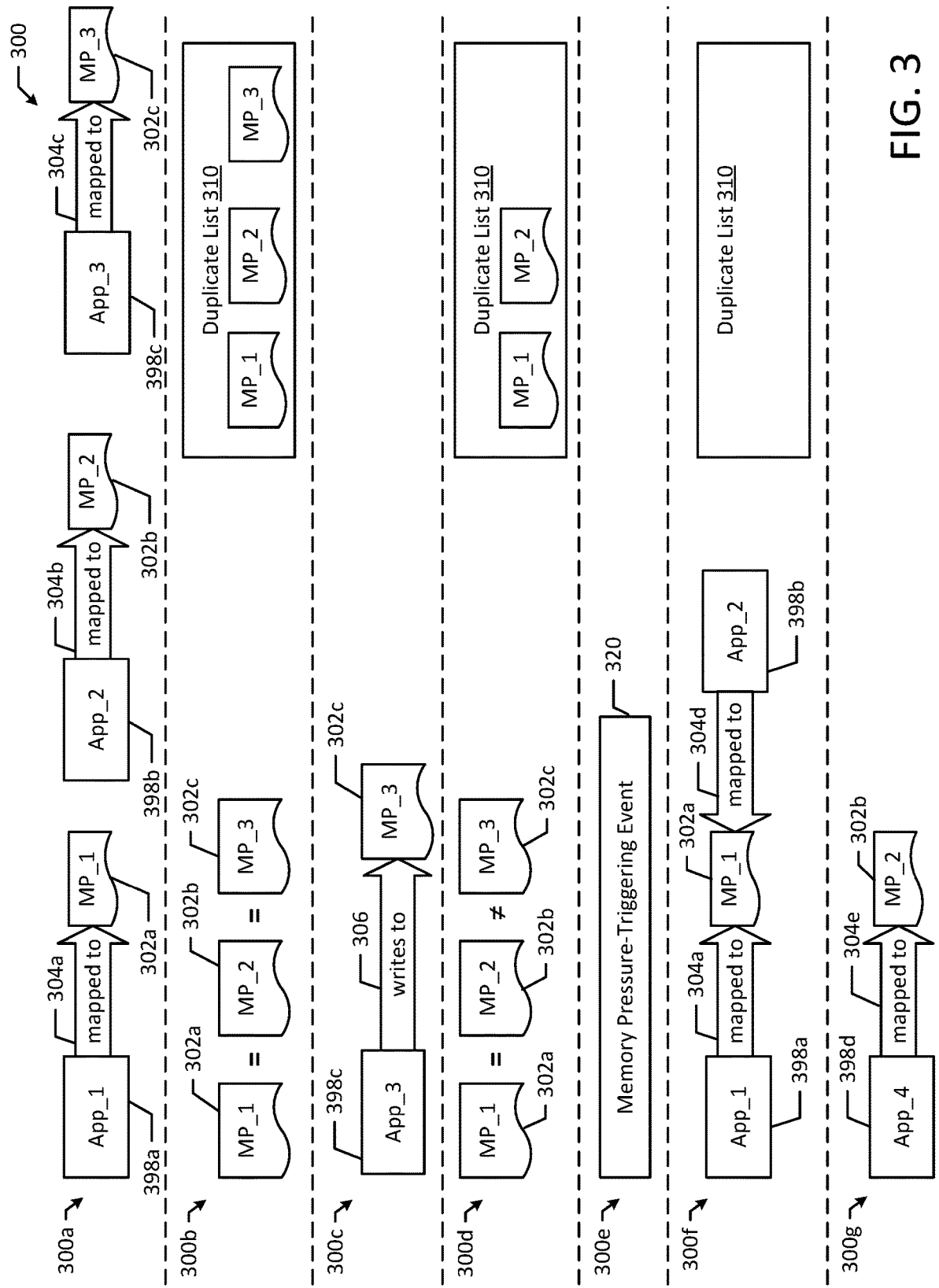
FIG. 3 illustrates a block diagram of an example process for same page merging according to an example embodiment of the present disclosure.

FIG. 3 illustrates a block diagram of an example process 300 for same page merging. The example process 300 is illustrated at various different stages 300a-g. At 300a, a first application 398a (e.g., "App_1") is mapped to a first memory or memory page 302a (e.g., "MP_1"). The mapping process 304a may be performed with a page table 200. Similarly, a second application 398b (e.g., "App_2") is mapped to a second memory or memory page 302b (e.g., "MP_2") through a mapping process 304b. Additionally, a third application 398c (e.g., "App_3") is mapped to a third memory or memory page 302c (e.g., "MP_3") through a mapping process 304c. The applications 398a-c, which may be referred to herein generally as applications 398, may write to their respective mapped memory while performing tasks, executing processes, etc. Applications 398 may be applications associated with a virtual machine 170, similar to application 198A. In another example, applications 398 may be programs or applications running on a host OS 186, similar to application 198E.

At 300b, a hypervisor 180 or supervisor 190 determines that each of the memory pages are duplicates (e.g., "MP_1"="MP_2"="MP_3") and the memory pages 302a-c are added to a duplicate list 310. For example, each memory page may include the same content, data, files, etc. In an example, the memory pages may be identical if the applications 398 are performing the same tasks or functions. Additionally, the memory pages 302a-c are write-protected when added to the duplicate list 310. Then, at 300c, application 398c (e.g., "App_3") writes to memory page 302c (e.g., "MP_3"). In an example, the hypervisor 180 or supervisor 190 intercepts the write attempt, changes the page protection (e.g., from read-only to read-write), and then proceeds with the write attempt.

Now that memory page 302c (e.g., "MP_3") has been written to, it is no longer a duplicate memory page. The memory page may have additional data added, data removed, or other data modified resulting in the memory page being different from previously identified duplicate pages. For example, at 300d, only memory pages 302a and 302b are duplicates (e.g., "MP_1"="MP_2" "MP_3") and memory page 302c is removed from the duplicate list 310. The memory page 302c may be removed from the duplicate list after the hypervisor 180 or supervisor 190 (e.g., kernel) performs another memory scan.

Then, at 300e, a memory pressure-triggering event 320 occurs. The memory pressure-triggering event 320 may include the system 100 reaching a threshold level of RAM usage. In another example, the memory pressure-triggering event may be memory pressure that forces a program or application to close. The memory-pressure triggering event 320 may also include moving a portion of memory to a different form of storage. For example, a portion of memory may be written from RAM to disk.

At 300f, once the memory pressure-triggering event 320 is detected, one of the duplicate memory pages (e.g., memory page 302b or "MP_2") is removed from the duplicate list 310 and discarded. The other duplicate memory page (e.g., memory page 302a or "MP_1") is shared between application 398a and 398b. For example, both applications 398a and 398b are mapped to the first memory or memory page 302a (e.g., "MP_1") through mapping processes 304a and 304d. In the illustrated example, application 398a has already been mapped to the first memory page 302a through mapping process 304a at 300a.

At 300g, the discarded memory page 302b (e.g., "MP_2") is reused, such as being supplied to another application 398d (e.g., "App 4"). For example, the application 398d may be mapped to the discarded memory page 302b through mapping process 304e, such that the memory page 302b may be re-used by application 398d.

Figure 4:
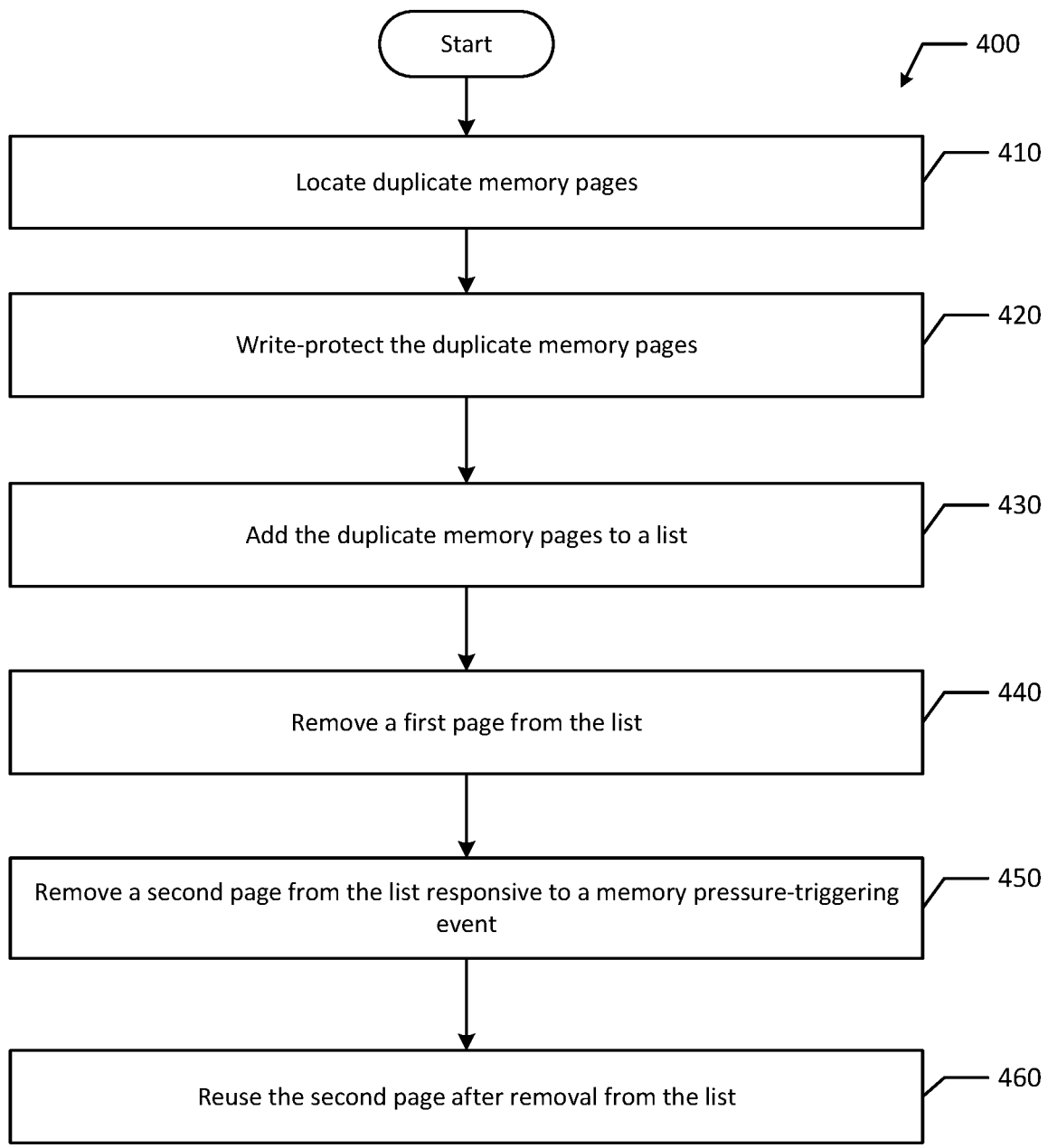
FIG. 4 illustrates a flowchart of an example process for same page merging according to an example embodiment of the present disclosure.

FIG. 4 illustrates a flowchart of an example method 400 for same page merging in accordance with an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

In the illustrated example, method 400 includes locating duplicate memory pages (block 410). For example, a supervisor 190 may locate at least two duplicate memory pages. Duplicate memory pages may include the same data or may contain the same files. Method 400 also includes write-protecting the duplicate memory pages (block 420). For example, the supervisor 190 may write-protect the at least two duplicate memory pages. Write-protecting the at least two duplicate memory pages includes setting a respective status of each respective page, of the at least two duplicate memory pages, to read-only. Additionally, method 400 includes adding the duplicate memory pages to a list (block 430). For example, the supervisor may add the at least two duplicate memory pages to a list.

Method 400 also includes removing a first page from the list (block 440). For example, responsive to the first page of the at least two duplicate memory pages changing, the supervisor 190 may remove the first page from the list. The first page may change when a program, process or application writes to the memory page. For example, a memory page changes when a file, data or other information is added or removed, such that the first page is different from its previous state. In another example, a memory page may be considered a changed page if the protection of the page changes (e.g., write-protection disabled).

Additionally, method 400 includes removing a second page from the list responsive to a memory pressure-triggering event (block 450). For example, responsive to a memory pressure-triggering event, the supervisor 190 may remove a second page of the at least two duplicate memory pages from the list. In an example, the memory pressure-triggering event may include reaching a threshold level of RAM usage. Another example memory pressure-triggering event may include forcing a process, program or application to stop or close. Also, a memory pressure-triggering event may include moving a portion of memory to a different form of storage (e.g., from RAM to disk). Additionally, after removing the second page from the list, the supervisor 190 may leave one of the duplicate memory pages unchanged and may re-map each duplicate page to point to the same physical page. By deferring the de-duplication until memory pressure exists, the overhead and latency associated with COW may be avoided until necessary.

Method 400 also includes reusing the second page after removal from the list (block 460). For example, the supervisor 190 may designate the page for reuse after removal from the list. In an example, the supervisor 190 may assign or associate the second page with a new application or process. For example, the supervisor 190 may map another application to the second page so the application can use the memory page.

Figure 5A:
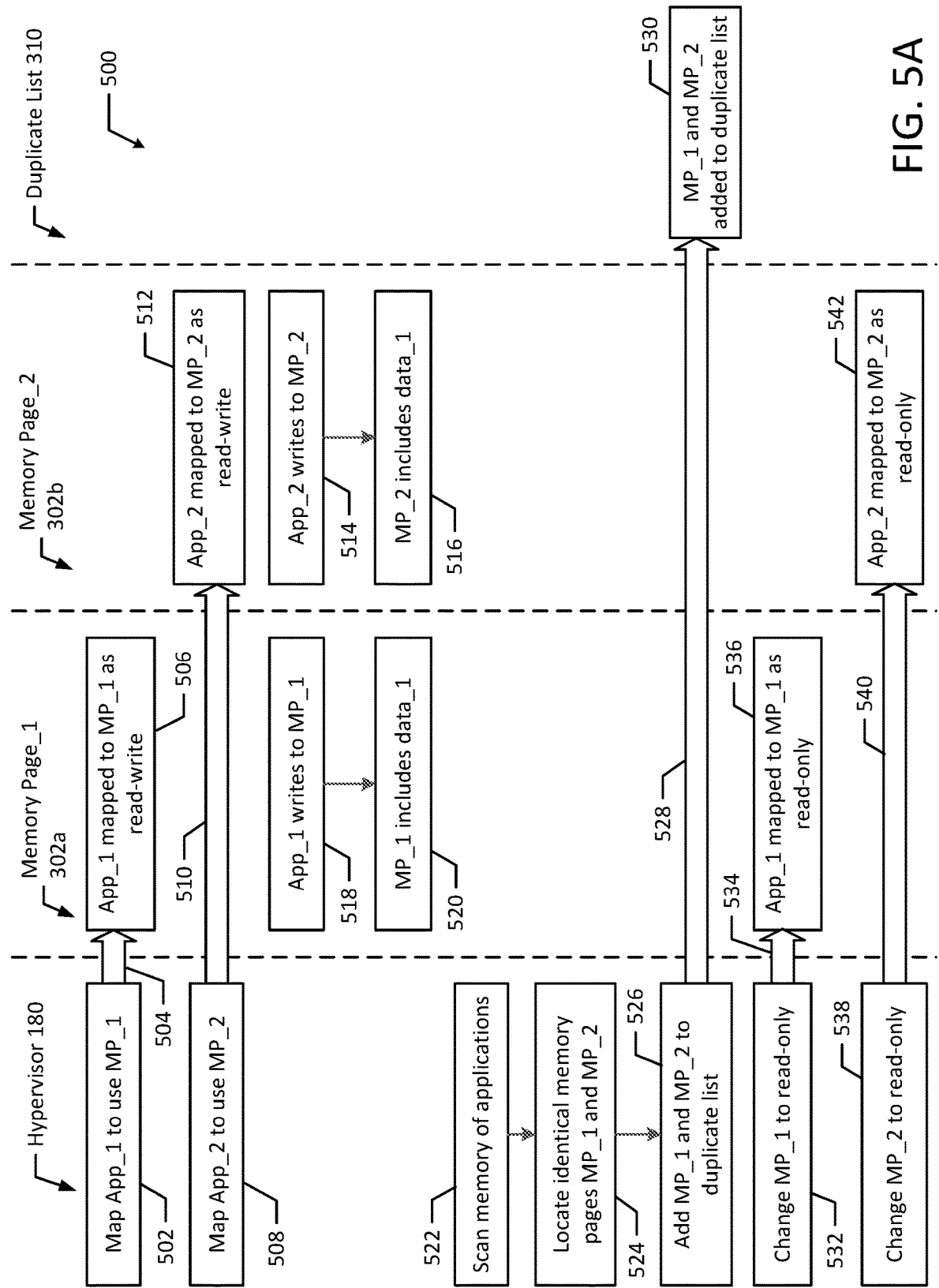
FIGS. 5A and 5B illustrate a flow diagram of an example process for merging and discarding duplicate memory pages according to an example embodiment of the present disclosure.
Figure 5B:
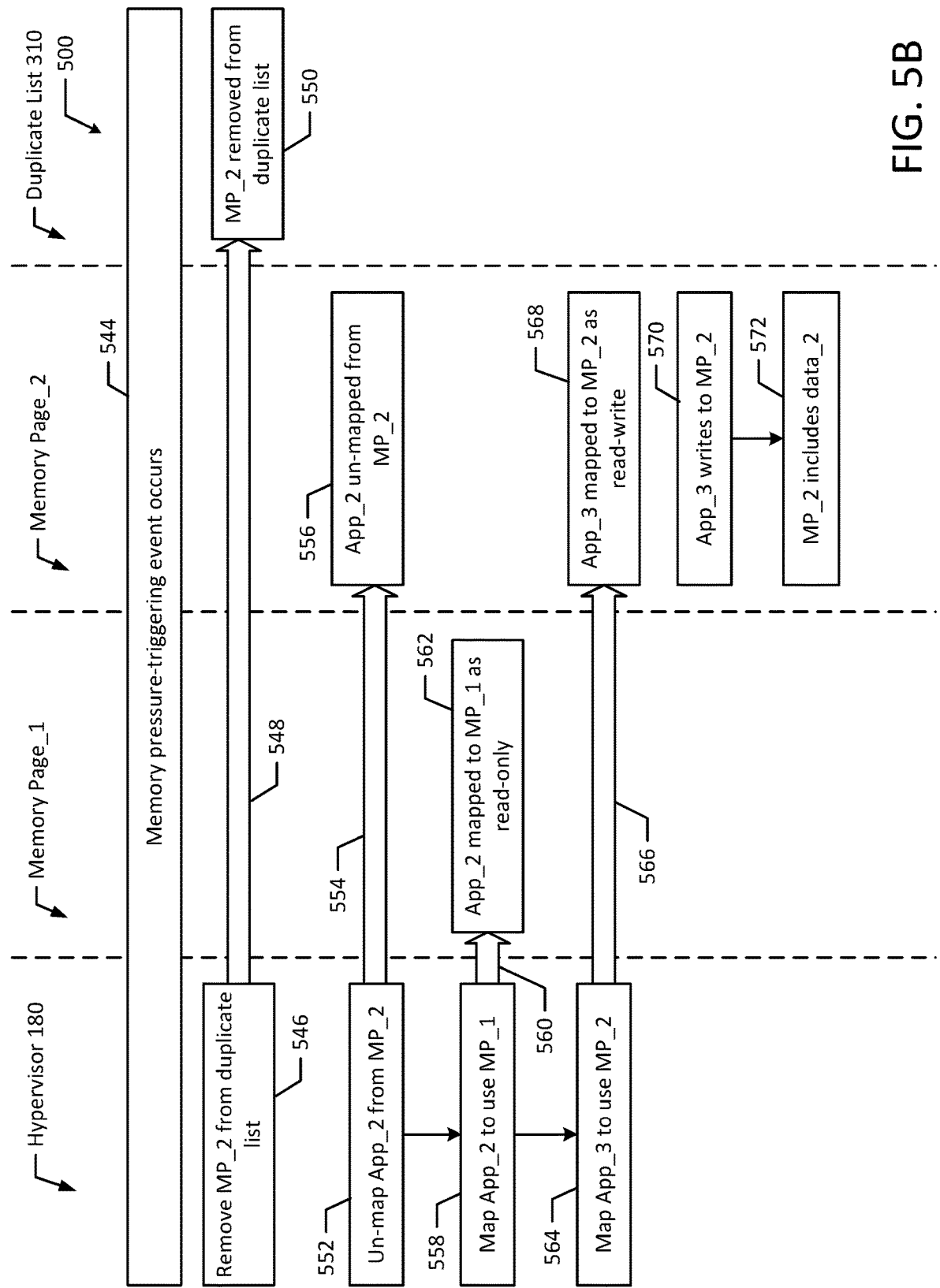

FIGS. 5A and 5B depict a flow diagram illustrating an example method 500 for merging and discarding duplicate memory pages according to an example embodiment of the present disclosure. Although the example method 500 is described with reference to the flow diagram illustrated in FIG. 5, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, a supervisor 190 or hypervisor 180 may communicate with applications and their associated memory pages 302a-b and duplicate list 310 to perform example method 500.

In the illustrated example, a hypervisor 180 maps an application (e.g., "App_1") to use a first memory page 302a (e.g., "MP_1") (block 502). For example, the mapping 504 between "App_1" and "MP_1" may be achieved with a page table 200. Then, "App_1" is mapped to "MP_1" as read-write (block 506). Similarly, the hypervisor 180 maps another application (e.g., "App_2") to use a second memory page 302b (e.g., "MP_2") (block 508). Similar to mapping 504, the mapping 510 between "App_2" and "MP_2" may be achieved with a page table 200. Then, "App_2" is mapped to "MP_2" as read-write (block 512). Once the applications are mapped to their respective memory pages, the applications may use the memory pages while executing or performing tasks.

"App_2" writes data to "MP_2" (block 514). Then, "MP_2" includes "data_1" (block 516). For example, "App_2" may retrieve data from one memory location and write the data to its mapped memory (e.g., "MP_2"). The write operation may be performed while the application is executing routine tasks. Additionally, "App_1" writes the same data to "MP_1" (block 518). Now, "MP_1" also includes "data_1" (block 520). Both applications (e.g., "App_2" and "App_1") may be performing the same tasks and therefore may be retrieving and writing the same data to their mapped memory. In one example, the applications may be different application instances of the same application.

The hypervisor 180 scans memory of the applications (block 522). For example, the hypervisor 180, or similarly a supervisor 190 (e.g., kernel) may perform KSM, which enables the hypervisor 180 or supervisor 190 (e.g., kernel) to examine two or more already running programs or applications and compare their memory. The memory (e.g., "MP_1", "MP_2" and "MP_3" may be periodically scanned by the hypervisor 180. Then, the hypervisor 180 locates identical memory pages "MP_1" and "MP_2" (block 524). After locating identical memory pages, the hypervisor 180 adds "MP_1" and "MP_2" to the duplicate list 310 (block 526). For example, a reference to the memory pages may be added to the duplicate list. Alternatively, a flag or notation in the memory pages metadata may indicate that the pages are duplicate pages. Then, "MP_1" and "MP_2" are added to the duplicate list, such that the duplicate list includes "MP_1" and "MP_2" (block 530). The addition 528 of the memory pages to the duplicate list may be a reference to the memory page or a pointer to the memory page.

After the memory pages are added to the duplicate list 310, the hypervisor 180 changes "MP_1" to read-only (block 532). Write-protecting the memory page (e.g., "MP_1" prevents its modification in the event memory pages are de-duplicated and the remaining page (e.g., "MP_1") is shared across multiple guests. Then, "App_1" is mapped to "MP_1" as read-only (block 536). For example, the hypervisor 180 may update the mapping 534 and more specifically, the protection identifier associated with the mapping 534 or page table to read-only. Similarly, the hypervisor 180 changes "MP_2" to read-only (block 538). "MP_2" is write-protected for the same reasons discussed above with respect to "MP_1", as the system is uncertain which of the pages may be de-duplicated or shared in the future, if memory pressure occurs and one of the pages is needed for re-use by another processor or application. Then, "App_2" is mapped to "MP_2" as read-only (block 542). For example, the hypervisor 180 may update the mapping 540 and more specifically, the protection identifier associated with the mapping 540 or page table to read-only.

Continuing on FIG. 5B, a memory pressure-triggering event occurs (block 544). The memory pressure-triggering event may include reaching a threshold level of RAM usage, the system forcing a process, program or application to stop or close, etc. Then, the hypervisor removes "MP_2" from the duplicate list 310 (block 546). For example, the reference to the memory pages may be removed from the duplicate list. Alternatively, the flag or notation in the memory pages metadata indicating that the pages are duplicate pages may be removed. Then, "MP_2" is removed from the duplicate list, such that the duplicate list is empty (block 550). In another example, the removal 548 of the memory page from the duplicate list may be removing a reference to the memory page or a pointer to the memory page from the duplicate list 310.

Then, the hypervisor un-maps "App_2" from "MP_2" (block 552). For example, the hypervisor 180 may update the mapping 548 and more specifically, delete the mapping 548 or page table that associates "App_2" with "MP_2". Now, "App_2" is un-mapped from "MP_2" (block 556). Then, the hypervisor 180 maps "App_2" to use "MP_1" (block 558). For example, the hypervisor 180 may update the mapping 560 or page table such that both "App_1" and "App_2" are mapped to "MP_1". Now, "App_2" is mapped to "MP_1" (block 562). Since the resource (e.g., "MP_1") was a duplicate memory page, but not modified, the resource can be shared between guests (e.g., applications, guest operating systems, VMs) that use the resource to reduce memory used by the applications.

Then, the de-duplicated page (e.g., "MP_2") may be reused to relieve memory pressure. For example, an application in need of memory (e.g., "App_3") may be mapped to use "MP_2" (block 564). For example, the hypervisor 180 may update the mapping 566 or page table such that "MP_2" is reused and mapped to "App_3". Now, "App_3" is mapped to "MP_2" (block 566). Once MP_2 is reused and supplied to "App_3", the application may use and write to the memory page to perform tasks and execute functions. For example, "App_3" writes to "MP_2" (block 570) such that "MP_2" includes "data_2." (block 572). The memory used by the applications may be periodically scanned, added to or removed from the duplicate list 310, and de-duplicated for reuse by the hypervisor 180 to relieve memory pressure when necessary. By doing so, the hypervisor 180 may advantageously react to memory pressure while avoiding the overhead and latency associated with COW and SWAP (and the I/O storms that SWAP may cause), which may result in poor performance.

Figure 6:
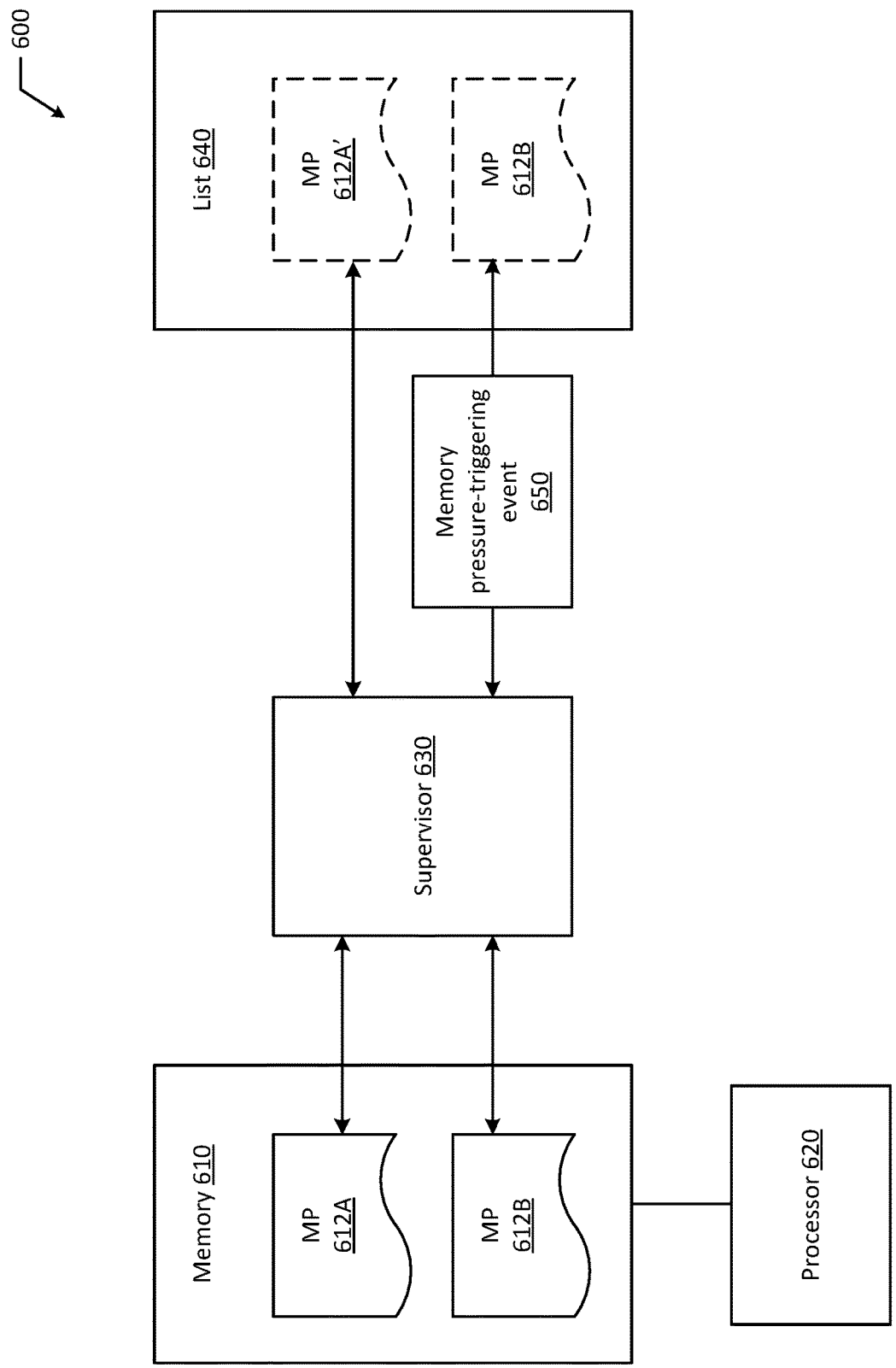
FIG. 6 illustrates a block diagram of an example page merging system according to an example embodiment of the present disclosure.

FIG. 6 is a block diagram of an example page merging system 600 according to an example embodiment of the present disclosure. The system 600 includes a system includes a memory 610 including a plurality of memory pages 612A and 612B, a processor 620 in communication with the memory 610, and a supervisor 630. The supervisor 630 is configured to locate at least two duplicate memory pages 612A and 612B of the plurality of memory pages 612A-B. The supervisor 630 is also configured to write-protect the at least two duplicate memory pages 612A and 612B. The supervisor 630 may also add the at least two duplicate memory pages 612A and 612B to a list 640.

Responsive to a first page 612A' of the at least two duplicate memory pages 612A-B changing, the supervisor 630 is configured to remove the first page 612A from the list 640. Responsive to a memory pressure-triggering event 650, the supervisor 630 is configured to remove a second page 612B of the at least two duplicate memory pages 612A-B from the list 640. The second page 612B may be reused after removal from the list 640.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory including a plurality of memory pages; and
a processor in communication with the memory which stores at least two duplicate memory pages that are write-protected, and the at least two duplicate memory pages are included in a list, wherein the processor is configured to:
responsive to a first page of the at least two duplicate memory pages changing, remove the first page from the list, and
responsive to a memory pressure-triggering event, remove a second page of the at least two duplicate memory pages from the list, wherein the second page is reused after removal from the list.

2. The system of claim 1, wherein each of the at least two duplicate memory pages are included in the list as a reference to a respective one of the at least two duplicate memory pages.

3. The system of claim 1, wherein each of the at least two duplicate memory pages are included in the list as a pointer to a respective one of the at least two duplicate memory pages.

4. The system of claim 1, wherein write-protecting at least one duplicate memory page includes setting a respective status of each respective page, of the at least one duplicate memory page, to read-only.

5. The system of claim 1, wherein the memory pressure-triggering event includes at least one of reaching a threshold level of RAM usage, forcing at least one of a program or application to close, or moving a portion of memory to a different form of storage.

6. The system of claim 5, wherein moving the portion of memory to the different form of storage includes writing the portion of memory to disk.

7. The system of claim 1, wherein the first page is initially mapped to a first application and the second page is initially mapped to a second application.

8. The system of claim 7, wherein reusing the second page includes supplying the second page to a third application.

9. A method comprising:
responsive to a first page of at least two duplicate memory pages changing, removing, by a processor, the first page from a list stored in a memory, the list storing at least two duplicate memory pages that are write-protected;

responsive to a memory pressure-triggering event, removing, by the processor, a second page of the at least two duplicate memory pages from the list; and reusing the second page after removal from the list.

10. The method of claim 9, wherein each of the at least two duplicate memory pages are included in the list as a reference to a respective one of the at least two duplicate memory pages.

11. The method of claim 9, wherein each of the at least two duplicate memory pages are included in the list as a pointer to a respective one of the at least two duplicate memory pages.

12. The method of claim 9, write-protecting at least one duplicate memory page includes setting a respective status, of the at least one duplicate memory page, to read-only.

13. The method of claim 9, wherein the memory pressure-triggering event includes reaching a threshold level of RAM usage.

14. The method of claim 9, wherein the memory pressure-triggering event includes forcing at least one of a program or application to close.

15. The method of claim 9, wherein the memory pressure-triggering event includes moving a portion of memory to a different form of storage.

16. The method of claim 15, wherein moving the portion of memory to the different form of storage includes writing the portion of memory to disk.

17. The method of claim 9, wherein the first page is initially mapped to a first application and the second page is initially mapped to a second application.

18. The method of claim 17, wherein reusing the second page includes supplying the second page to a third application.

19. The method of claim 9, wherein the first page of the at least two duplicate memory pages changes based on at least one of the first application attempting to write to the first page, the write-protection of the first page being disabled, or the first application writing to the first page.

20. A non-transitory machine readable medium storing code, which when executed by at least one processor is configured to:

responsive to a first page of at least two duplicate memory pages changing, remove the first page from a list stored in a memory, the list storing at least two duplicate memory pages that are write-protected;

responsive to a memory pressure-triggering event, remove a second page of the at least two duplicate memory pages from the list; and reuse the second page after removal from the list.

* * * * *

UNITED STATES PATENT AND TRADEMARK OFFICE
CERTIFICATE OF CORRECTION

PATENT NO. : 11,734,182 B2
APPLICATION NO. : 17/838678
DATED : August 22, 2023
INVENTOR(S) : Michael Tsirkin et al.

It is certified that error appears in the above-identified patent and that said Letters Patent is hereby corrected as shown below:

In the Specification

In Column 8, Line 25, replace:
"(e.g., "MP_1"="MP_2" "MP_3")" with -- (e.g., "MP_1" = "MP_2" ≠ "MP_3") --.

In Column 8, Line 52, replace:
"(e.g., App 4)" with -- (e.g., App_4) --.

Signed and Sealed this
Twenty-sixth Day of December, 2023

Katherine Kelly Vidal
*Director of the United States Patent and Trademark Office*